United States Patent [19]
Scherenberg

[11] 3,744,815
[45] July 10, 1973

[54] INFLATABLE GAS CUSHION FOR THE PROTECTION OF VEHICLE PASSENGERS, ESPECIALLY MOTOR VEHICLES

[75] Inventor: Hans O. Scherenberg, Stuttgart-Heumaden, Germany

[73] Assignee: Daimler-Benz Aktiengesellschaft, Stuttgart-Unterturckheim, Germany

[22] Filed: Mar. 23, 1971

[21] Appl. No.: 127,209

[30] Foreign Application Priority Data
Mar. 24, 1970 Germany.................. P 20 14 048.1

[52] U.S. Cl. .......................................... 280/150 AB
[51] Int. Cl. ............................................ B60r 21/10
[58] Field of Search .................. 280/150 AB; 9/316; 222/3

[56] References Cited
UNITED STATES PATENTS
3,582,107  6/1971  Goetz et al. .................. 280/150 AB
3,642,303  2/1972  Irish et al. ..................... 280/150 AB

*Primary Examiner*—Kenneth H. Betts
*Attorney*—Craig, Antonelli, Stewart & Hill

[57] ABSTRACT

An automatically inflatable gas cushion system for the protection of the passengers of vehicles, particularly of motor vehicles, in which the gas cushion is automatically inflated in case of accidents by means of a gas under high pressure which is released by a switch for filling the gas cushion upon exceeding a predetermined deceleration; the pressure in the gas cushion is again exhausted immediately thereafter while a second compressed gas supply is provided which can be released for a renewed inflation of the gas cushion only after the gas cushion has been once filled and exhausted beforehand.

11 Claims, 1 Drawing Figure

PATENTED JUL 10 1973
3,744,815
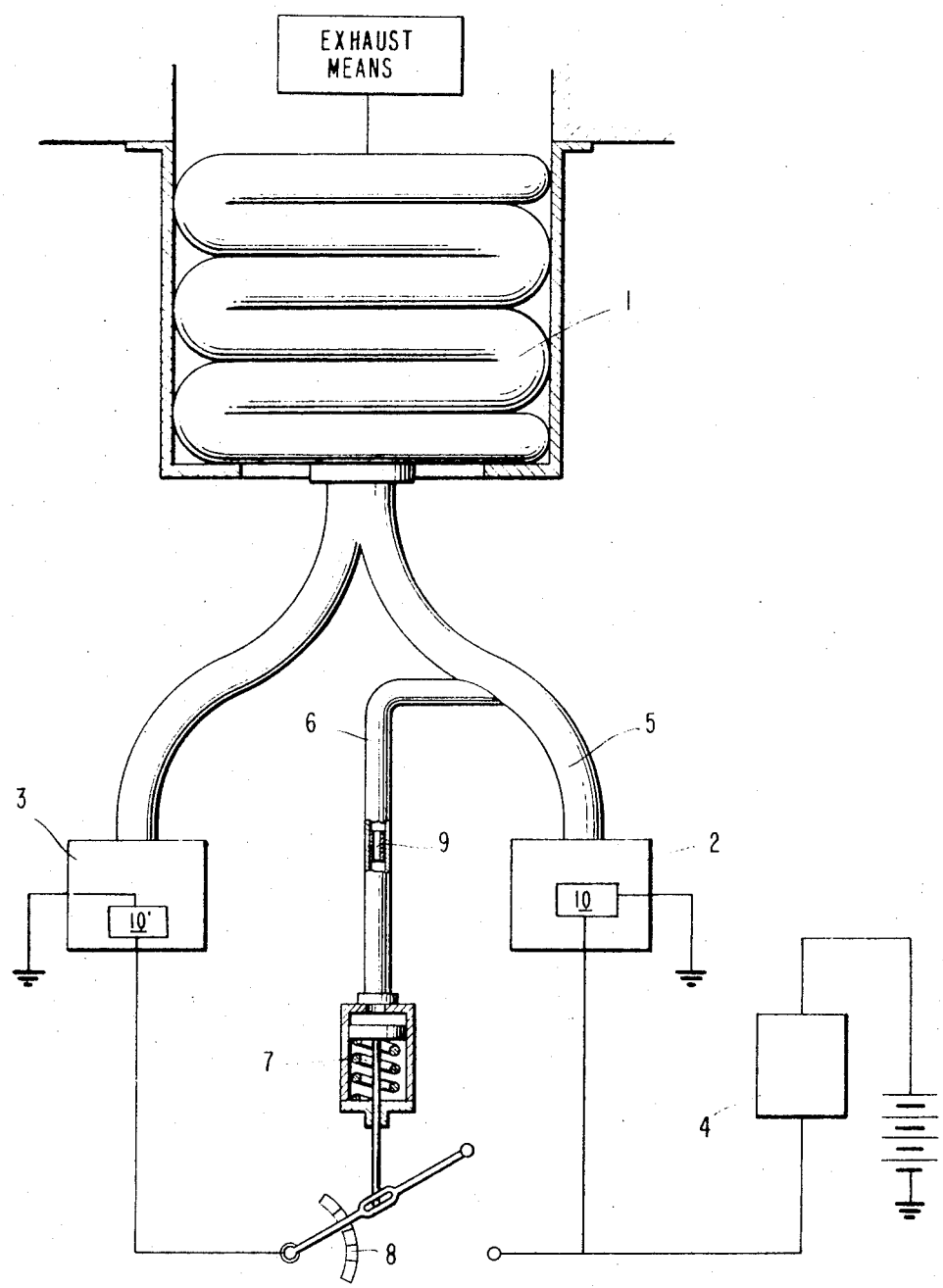
INVENTOR
HANS O. SCHERENBERG
BY [signature]
ATTORNEYS

INFLATABLE GAS CUSHION FOR THE PROTECTION OF VEHICLE PASSENGERS, ESPECIALLY MOTOR VEHICLES

The present invention relates to a gas cushion adapted to be inflated automatically during accidents for the protection of the passengers of vehicles, especially of motor vehicles, in which upon exceeding a predetermined deceleration, a gas up to that time kept under high pressure is released for filling the gas cushion by way of a control device, and whereby means are provided to reduce again directly thereafter the pressure in the gas cushion.

Such types of gas cushions serve the purpose to absorb and to brake the bodies of the vehicle passengers during an at least essentially frontal impact of the vehicle against an obstacle. Pressure in this gas cushion is again reduced after the impact of the vehicle in a fraction of a second in order not to prevent the vehicle passengers, for example, from rapidly leaving the vehicle. Thus, the gas cushions known heretofore provide only protection for the vehicle passengers during a single, non-repeating frontal impact.

In contradistinction thereto, the present invention is based on the recognition that, for example, with a spinning or skidding vehicle, an impact against obstacles may take place two or more times, one shortly after the other. Since, however, as described above, the pressure in the gas cushion is again very rapidly reduced or exhausted, no protection would be provided any longer by the prior art constructions for the vehicle passengers during a second impact.

As solution to the underlying problems, a gas cushion automatically inflatable during accidents for the protection of the passengers of vehicles, especially of motor vehicles, is proposed in which upon exceeding a predetermined deceleration, a gas up to that point under high pressure is released by way of a control device for the filling of the gas cushion, and whereby means are provided in order to reduce again directly thereafter the pressure in the gas cushion, whereby according to the present invention at least a second pressure gas supply is provided, and a release of this second pressure gas supply is possible only after the filling and exhaust of the gas cushion.

A particularly simple construction is achieved if at least two pressure gas tanks or containers each equipped with a bursting or explosive charge are provided, whereby the bursting or explosive charges are ignited sequentially by electric pulses stemming from the same switch.

Preferably an electrical connection exists in the starting condition between the switch and the bursting or explosive charge of the first pressure gas tank, and an electric connection to the bursting or explosive charge of the second pressure gas tank is established by the pressure wave resulting from the outflow of the gases out of the first pressure gas tank.

In order that an unintentional premature ignition of the second bursting or explosive charge is avoided with certainty, the electrical connection between the switch and the second bursting or explosive charge should be established with such a delay that the first electric pulse starting from the switch cannot effect also the ignition of this bursting or explosive charge.

Accordingly, it is an object of the present invention to provide an inflatable gas cushion protection for the passengers of vehicles, especially motor vehicles, which avoids by simple means the aforementioned shortcomings and drawbacks encountered in the prior art.

Another object of the present invention resides in an inflatable gas cushion system for the protection of motor vehicle passengers which provides not only a protection in case of a single impact, but also a protection in case of repeated impact succeeding one another in short intervals.

A further object of the present invention resides in an inflatable gas cushion system for the protection of passengers of vehicles, especially motor vehicles which is simple in construction and reliable in operation for its intended purposes.

These and further objects, features and advantages of the present invention will become more obvious from the following description when taken in connection with the accompanying drawing which shows, for purposes of illustration only, one embodiment in accordance with the present invention, and wherein:

The single FIGURE is a schematic view of an inflatable cushion system for the protection of motor vehicle passengers in accordance with the present invention.

Referring now to the single FIGURE of the drawing, a first and a second compressed gas tank 2 and 3, each equipped with its own explosive or bursting charge 10, 10', is connected with an inflatable gas cushion 1 of conventional construction. An electrical connection exists in the initial starting condition illustrated in the drawing between the bursting charge 10 of the first compressed gas container 2 and a switch 4 responsive upon exceeding a predetermined deceleration. The bursting charge 10 of the first compressed air container 2 is ignited by an electric pulse initiated or triggered upon response of the switch 4, and the gas flows into the gas cushion 1 by way of the pipe line 5. The pressure thereby building up in the pipe line 5 is transmitted by way of a branch line 6 to a pressure switch which thereby establishes a permanent electrical connection—indicated in the drawing by a spring-detent element 8—with the bursting charge 10' of the second compressed gas container 3. In order to avoid with certainty that the bursting charge 10' of the second compressed gas container 3 is also ignited by the first electric pulse produced by the switch 4, a throttling place 9 is arranged in the branch line 6 which permits the pressure switch 7 to respond only after the first electric pulse has faded. Conventional means are provided to exhaust the gas cushion 1 in a fraction of a second after its initial filling with the gas from tank 2. Since such means are known, as such, a detailed description thereof is dispensed with herein.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intended to cover all such changes and modifications as are encompassed by the scope of the appended claims.

I claim:

1. A gas cushion arrangement for the protection of passengers of vehicles in the event of excessive vehicle deceleration during collisions and the like; said arrangement comprising: inflatable gas cushion means, first compressed gas supply means, sensor means for sensing a first vehicle deceleration in excess of a predetermined value, first gas circuit means operatively connected to said sensor means and including means for communicating said first compressed gas supply means with said gas cushion means to inflate said gas cushion means in response to said first vehicle deceleration, exhaust means for exhausting gas from the gas cushion means after inflation of said gas cushion means, second compressed gas supply means, said sensor means including means for sensing a second vehicle deceleration in excess of a predetermined value, second gas circuit means operatively connected to said sensor means and including means for communicating said second compressed gas supply means with said gas cushion means to inflate said gas cushion means in response to said second vehicle deceleration, and gas circuit interconnecting means for preventing actuation of said second gas circuit means in response to said first vehicle deceleration, whereby said second compressed gas supply means is maintained intact for later inflation of said gas cushion means in the event of a further vehicle deceleration in excess of a predetermined value.

2. An arrangement according to claim 1, wherein said gas circuit interconnecting means includes a resetting means for maintaining said second compressed gas supply means independent from said sensor means until said gas cushion means has been inflated in response to said first vehicle deceleration.

3. An arrangement according to claim 2, wherein said sensor means includes means for producing an electrical ignition signal in response to said decelerations, and wherein said first and second gas circuit means include line means for communicating said signal to respective propellant charge means located in said respective gas supply means.

4. An arrangement according to claim 2, wherein said resetting means includes means for interconnecting said second gas circuit means between said second compressed gas supply means and said sensor means in response to gas back pressure formed in said first gas circuit during inflation of said gas cushion means by said first gas circuit and first compressed gas supply means.

5. An arrangement according to claim 4, wherein said resetting means includes a spring loaded piston member movable against the spring force by said gas back pressure, and a switch member attached to said piston member, said switch member being operable to interconnect said second gas supply means with said sensor means.

6. An arrangement according to claim 5, wherein said gas back pressure is communicated to said piston member by way of restricted orifice means such that movement of said switch member to the position interconnecting said second gas supply means with said sensor means is delayed until the signal associated with said first deceleration has been dissipated in said first gas circuit means.

7. An arrangement according to claim 5, wherein said sensor means includes means for producing an electrical ignition signal in response to said decelerations, and wherein said first and second gas circuit means include line means for communicating said signal to respective propellant charge means located in said respective gas supply means.

8. An arrangement according to claim 4, wherein said sensor means includes means for producing an electrical ignition signal in response to said decelerations, and wherein said first and second gas circuit means include line means for communicating said signal to respective propellant charge means located in said respective gas supply means.

9. An arrangement according to claim 1, wherein said sensor means includes means for producing an electrical ignition signal in response to said decelerations, and wherein said first and second gas circuit means include line means for communicating said signal to respective propellant charge means located in said respective gas supply means.

10. An arrangement according to claim 9, wherein in the initial condition an electrical connection exists between the sensor means and the propellant charge means of said first gas supply means, and wherein said gas circuit interconnecting means includes means responsive to the pressure wave resulting from the outflow of gas from the first gas supply means to electrically connect said sensor means with said second gas supply means.

11. An arrangement according to claim 10, wherein said means responsive to said pressure wave includes means for delaying the electrical connection of said sensor means and second gas supply means such that an electrical output signal from said sensor means corresponding to said first deceleration is inoperative to ignite the propellant charge of said second gas supply means.

* * * * *